(12) United States Patent
Wang et al.

(10) Patent No.: US 11,483,779 B2
(45) Date of Patent: Oct. 25, 2022

(54) USER EQUIPMENT AND COMMUNICATION METHOD

(71) Applicant: Chiun Mai Communication Systems, Inc., New Taipei (TW)

(72) Inventors: Chung-Tsung Wang, New Taipei (TW); Wen-Yi Kuo, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 17/368,758

(22) Filed: Jul. 6, 2021

(65) Prior Publication Data

US 2022/0061000 A1 Feb. 24, 2022

Related U.S. Application Data

(60) Provisional application No. 63/068,456, filed on Aug. 21, 2020.

(51) Int. Cl.
| | |
|---|---|
| *H04W 76/00* | (2018.01) |
| *H04W 52/52* | (2009.01) |
| *H04W 76/10* | (2018.01) |
| *H04L 5/14* | (2006.01) |
| *H04B 7/0404* | (2017.01) |

(52) U.S. Cl.
CPC .......... *H04W 52/52* (2013.01); *H04B 7/0404* (2013.01); *H04L 5/14* (2013.01); *H04W 76/10* (2018.02)

(58) Field of Classification Search
CPC ........ H04W 52/52; H04W 76/10; H04B 7/00; H04B 7/04; H04B 7/0404; H04B 1/00; H04L 5/14
See application file for complete search history.

(56) References Cited

U.S. PATENT DOCUMENTS

| | | | |
|---|---|---|---|
| 6,584,090 B1 * | 6/2003 | Abdelgany | ............... H04B 1/28 370/320 |
| 7,084,823 B2 | 8/2006 | Caimi et al. | |
| 9,374,056 B2 | 6/2016 | Bagger et al. | |
| 2009/0135078 A1 * | 5/2009 | Lindmark | ............... H01Q 1/523 343/844 |
| 2017/0373712 A1 | 12/2017 | Kim et al. | |
| 2018/0184388 A1 * | 6/2018 | Kam | ..................... H03F 1/0211 |

(Continued)

FOREIGN PATENT DOCUMENTS

| | | |
|---|---|---|
| CN | 104065395 A | 9/2014 |
| WO | 2015100955 A1 | 7/2015 |

*Primary Examiner* — Siu M Lee
(74) *Attorney, Agent, or Firm* — ScienBiziP, P.C.

(57) ABSTRACT

A user equipment and a communication method are provided. The user equipment includes a signal transceiver, a first antenna, a second antenna, a third antenna, and a power amplifier module. The signal transceiver applies a conversion between a baseband signal and a radio frequency signal. The first antenna is a primary antenna for receiving and transmitting RF signals. The second antenna is a diversity antenna for receiving RF signals. The third antenna is a low frequency antenna for transmitting signals in a specific low frequency band. The power amplifier module is electrically connected to the signal transceiver, the first antenna, and the third antenna. The power amplifier module amplifies the RF signal output by the signal transceiver and outputs same to either the first or third antenna.

20 Claims, 12 Drawing Sheets

(56) References Cited

U.S. PATENT DOCUMENTS

2020/0169967 A1* 5/2020 Yu ......................... H04W 24/08
2020/0313715 A1* 10/2020 Lee ........................ H04B 1/006
2021/0099137 A1* 4/2021 Drogi ..................... H03F 3/195
2021/0281281 A1* 9/2021 Xu .......................... H04B 1/50

* cited by examiner

USER EQUIPMENT AND COMMUNICATION METHOD

FIELD

The subject matter herein generally relates to wireless communication, and a user equipment and a communication method of the same.

BACKGROUND

In a communication between a user equipment, such as a handheld device, and a base station, because that a receiver (for example, the handheld device) has a multi-antenna system, reception characteristics are generally superior than transmission characteristics. In addition, because that a transmission power of the base station is much higher than that of the handheld device, and the reception characteristic of an antenna in the handheld device is much better than that of the transmitting characteristic, the handheld device may only receive signals at an edge of the area covered by the base station, while the base station cannot receive the signals of the handheld device. Space and battery capacity of the handheld device are limited, thus the handheld device cannot provide a high-power output as required in commercial settings.

In wireless transmissions, a low frequency band (such as a frequency band of LTE band14) has the characteristics of strong penetration compared with middle, high frequency bands and other frequency bands, so it can be effectively applied to police, government, and fire protection systems. However, since most handheld devices are not such high-powered, most handheld devices are not suitable for use in the police and fire protection systems. High power amplifiers are available to support handheld devices, but such high-power amplifiers tend to support certain high frequencies only, which are not beneficial for operations in low frequencies. High-power amplifiers which do support low-frequency use are generally not suitable for handheld devices because of their large sizes, high power demands, and high operating temperatures.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
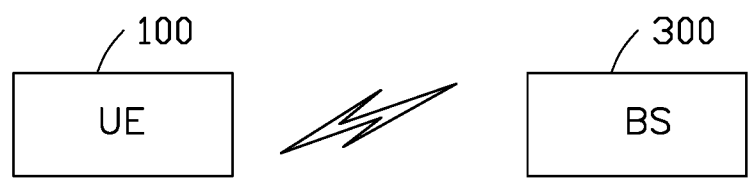
FIG. 1 is a schematic diagram showing communication layout between a UE (user equipment) and a BS (base station).

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder but can have one or more deviations from a true cylinder. The term "comprising," when utilized, means "including, but not necessarily limited to"; it specifically indicates open-ended inclusion or membership in the so-described combination, group, series, and the like.

In a communication between a user equipment (for example, a handheld device) and a base station, because a receiver (for example, the handheld device) has a multi-antenna system, which will have far better reception characteristics than transmission characteristics. In addition, because a transmission power of the base station is much higher than that of the handheld device, and the reception characteristic of an antenna in the handheld device is much better than that of the transmitting characteristic, the handheld device can only receive signals at an edge of the area covered by the base station, while the base station cannot receive the signals of the handheld device. Space and battery capacity of the handheld device are limited, thus the handheld device cannot provide a high-power output in commercial situation.

In wireless transmission, a low frequency band (such as a frequency band of LTE band14) has the characteristics of strong penetration compared with middle, high frequency bands and other frequency bands, so it can be effectively applied to police, government, and fire protection systems. However, since the current handheld device is not a high-powered device, it is limited to being used in the police and fire protection systems. High power amplifiers are available to support handheld devices, but such high-power amplifiers tend to support certain high frequencies only, the low frequencies are not helped. High-power amplifiers which do support low-frequency use are generally not suitable for handheld devices because of large sizes, high power demands, and high operating temperatures.

Then, in the present disclosure, a user equipment and a communication method are herein disclosed which provide a high-power performance and ability to function acceptably at low frequencies, and a communication range of the user equipment is effectively extended.

As illustrated in FIG. 1, in this embodiment, a user equipment (UE) 100 is provided. The UE 100 may communicate with a base station (BS) 300. The UE 100 can be, but not limited to, handheld communication devices (such as mobile phones), foldable phones, intelligent wearable devices (such as watches, headphones, etc.), tablet computers, and personal digital assistants (PDAs).

Figure 2:
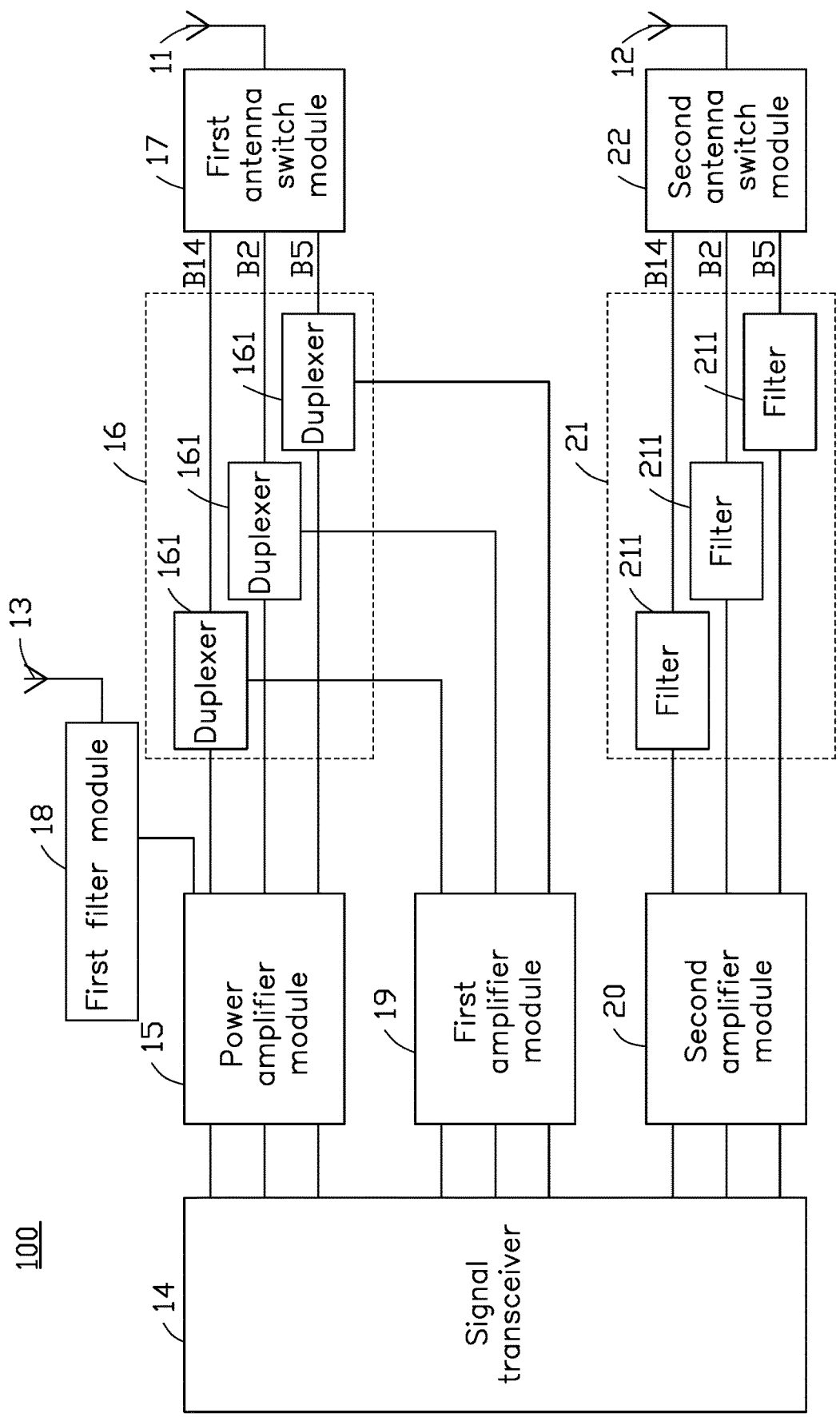
FIG. 2 is a module diagram of a user equipment of a first embodiment according to the present disclosure.

As illustrated in FIG. 2, the UE 100 at least includes a first antenna 11, a second antenna 12, a third antenna 13, a signal transceiver 14, a power amplifier module 15, a duplexer module 16, a first antenna switch module 17, and a first filter module 18.

In this embodiment, the first antenna 11 is a primary antenna. The first antenna 11 is used for receiving and transmitting radio frequency (RF) signals. The second antenna 12 is a diversity antenna. The second antenna 12 is used for receiving the RF signals.

In this embodiment, a specific structure, a layout location, a working frequency band, or other parameters of the first antenna 11 and the second antenna 12 are not limited so long as the first antenna 11 can receive and transmit the RF signals and the second antenna 12 can at least receive the RF signals. That is, the first antenna 11 is a transceiver antenna. The second antenna 12 is a receiving antenna.

In this embodiment, for convenience of description, taking the first antenna 11 can receive and transmit multiple low-frequency signals and the second antenna 12 can receive multiple low-frequency signals as an example. Specifically, in this embodiment, taking the first antenna 11 can receive and transmit RF signals in frequency bands of LTE band14, LTE band2, and LTE band5, and the second antenna 12 can receive the RF signals in frequency bands of LTE band14, LTE band2, and LTE band5 as an example. In other embodiments, reception of the RF signals of the above three frequency bands is not a limit and reception may be adjusted for other bands according to a specific situation. Similarly, the first antenna 11 and the second antenna 12 are not limited to the transmission and/or reception of low frequency signals and can also be used to transmit and/or receive RF signals of the middle frequency band, the high frequency band or other frequency bands.

The third antenna 13 may be used for transmission of low frequency signals. That is, in this embodiment, the third antenna 13 is a low frequency transmitting antenna. For example, in this embodiment, taking the third antenna 13 being used for the transmission of RF signals in a specific frequency band (for example, a frequency band of LTE band14) as an example. Similarly, in this embodiment, a specific structure, a layout location, and a working frequency band of the third antenna 13 are not limited, these features can be adjusted according to the specific situation and demand.

The signal transceiver 14 is used to convert a baseband signal and a radio frequency signal. For example, the signal transceiver 14 may receive a baseband signal, convert the baseband signal into a radio frequency signal, and transmit it through the first antenna 11 or the third antenna 13. For another example, when the first antenna 11 or the second antenna 12 receives a radio frequency signal, the signal transceiver 14 can receive the radio frequency signal and convert the radio frequency signal into a baseband signal.

The power amplifier module 15, the duplexer module 16, and the first antenna switch module 17 are electrically connected in that order between the signal transceiver 14 and the first antenna 11. The power amplifier (PA) module 15 is used to amplify the RF signals output by the signal transceiver 14. The duplexer module 16 and the first antenna switch module 17 cooperate with each other to select or switch the amplified RF signals output by the power amplifier module 15, and then transmit it through the first antenna 11.

In this embodiment, the duplexer module 16 includes three duplexers 161. Each duplexer 161 is connected between the power amplifier module 15 and the first antenna switch module 17. Each duplexer 161 corresponds to a frequency band of an RF signal. For example, the three duplexers 161 correspond to all of three frequency bands of LTE band14, LTE band2, and LTE band5. The first antenna switch module 17 can select any frequency band of LTE band14, LTE band2, and LTE band5, and transmit the RF signal through the first antenna 11.

In this embodiment, the first filter module 18 is a low pass filter (LPF). The first filter module 18 is electrically connected between the power amplifier module 15 and the third antenna 13. The first filter module 18 is used to filter the amplified RF signal after the RF signal output by the signal transceiver 14 is amplified by the power amplifier module 15, so as to filter out the RF signals (such as the RF signal of LTE band2 and LTE band5) which are not a specific low frequency signal (such as the frequency band of LTE band14).

In this embodiment, the UE 100 also includes a first amplifier module 19, a second amplifier module 20, a second filter module 21, and a second antenna switch module 22.

The first amplifier module 19 is electrically connected between the signal transceiver 14 and the duplexer module 16. Specifically, the first amplifier module 19 may be connected to each duplexer 161 of the duplexer module 16.

The second amplifier module 20, the second filter module 21, and the second antenna switch module 22 are electrically connected in that order between the signal transceiver 14 and the second antenna 12. The second filter module 21 and the second antenna switch module 22 cooperate with each other to receive the RF signal from the second antenna 12. The second filter module 21 and the second antenna switch module 22 also cooperate with each other to switch, select, and filter the RF signal, and then transmit the RF signal to the second amplifier module 20. The second amplifier module 20 amplifies the filtered RF signal and then transmits it to the signal transceiver 14 for processing (for example, the signal transceiver 14 converting it into a baseband signal).

In one embodiment, the first amplifier module 19 is a low noise amplifier (LNA) applied to a receiving end (PRx) of the primary antenna (for example, the first antenna 11). The second amplifier module 20 is an LNA applied to a receiving end (DRx) of the diversity antenna (for example, the second antenna 12). The second filter module 21 is a surface acoustic wave (SAW) filter. The second filter module 21 includes a plurality of filters 211 (for example, three filters 211). Each filter 211 allows an RF signal of a certain frequency to pass through. For example, the three filters 211 allow RF signals of LTE band14, LTE band2, and LTE band5 to pass through.

In this embodiment, the power amplifier module 15 is used to amplify the transmitted RF signal. The first amplifier module 19 amplifies the RF signal which is received. The power amplifier module 15 and the first amplifier module 19 both share the duplexer module 16. In this way, by setting the duplexer module 16, the received signal and the transmitted signal can be effectively separated or distinguished, thereby preventing the received signal and the transmitted signal from interfering with each other.

In this embodiment, referring to FIG. 3 to FIG. 6, the UE 100 establishing communication with the BS 300 to receive and/or transmit radio frequency signals using the first antenna 11, the second antenna 12, and the third antenna 13 is described.

Figure 3:
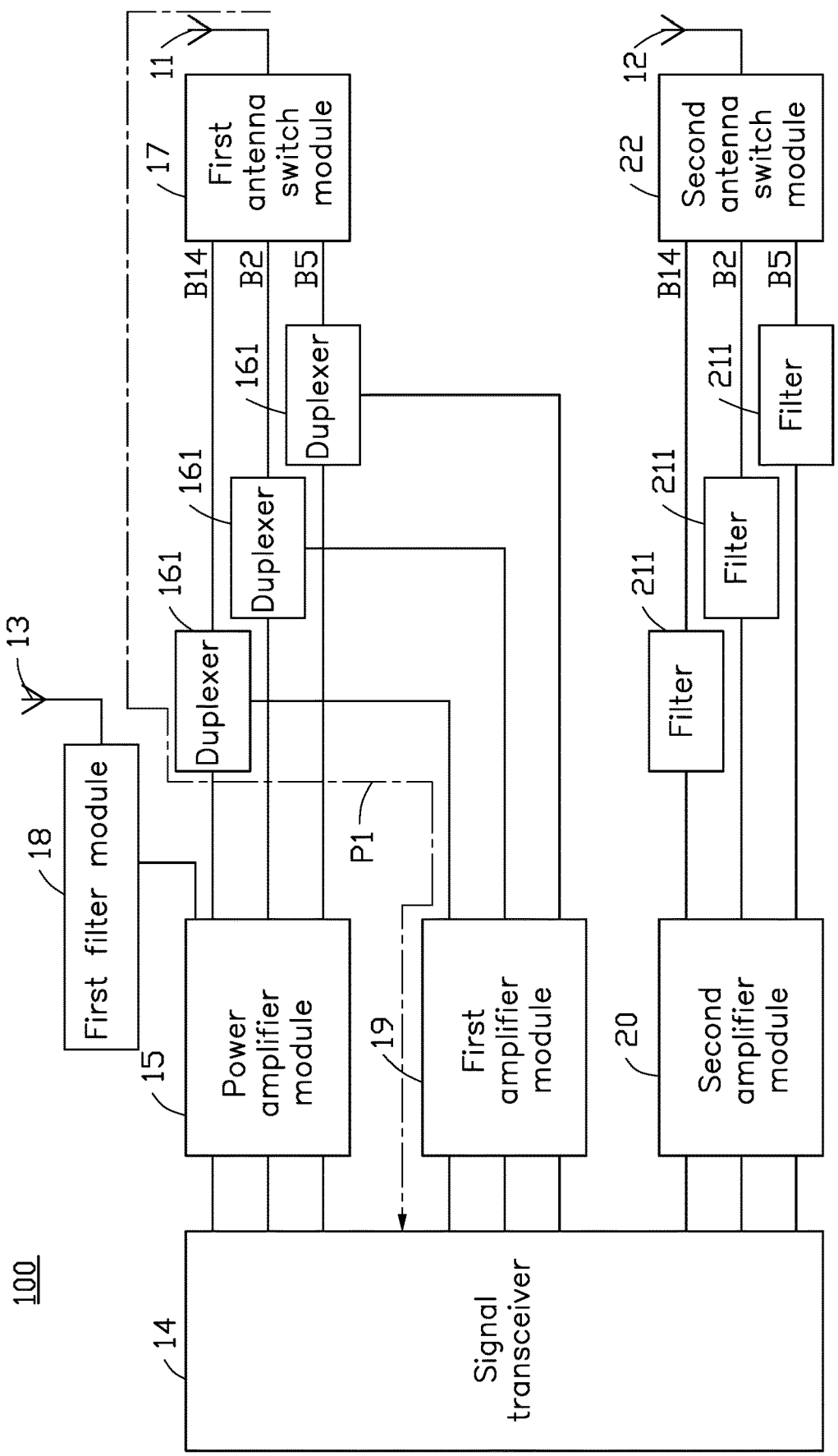
FIG. 3 is a first path distribution graph when a user equipment of an embodiment, according to the present disclosure, that receives radio frequency (RF) signals.

In a first situation, the UE 100 can establish communication with the BS 300 and receive the RF signal using the first antenna 11. For example, in this embodiment, the UE 100 can receive the RF signal through the first antenna 11, the first antenna switch module 17, the duplexer module 16, the first amplifier module 19, and the signal transceiver 14. Specifically, as illustrated in FIG. 3, when the first antenna 11 receives the RF signal from the BS 300, a corresponding frequency band (for example, a frequency band of LTE band14) can be selected through the first antenna switch module 17 and duplexer module 16. The signal of the frequency band of LTE band14 is amplified through the first amplifier module 19, and then is transmitted to the signal transceiver 14 for processing. For example, the signal is converted into a baseband signal (see path P1).

Figure 4:
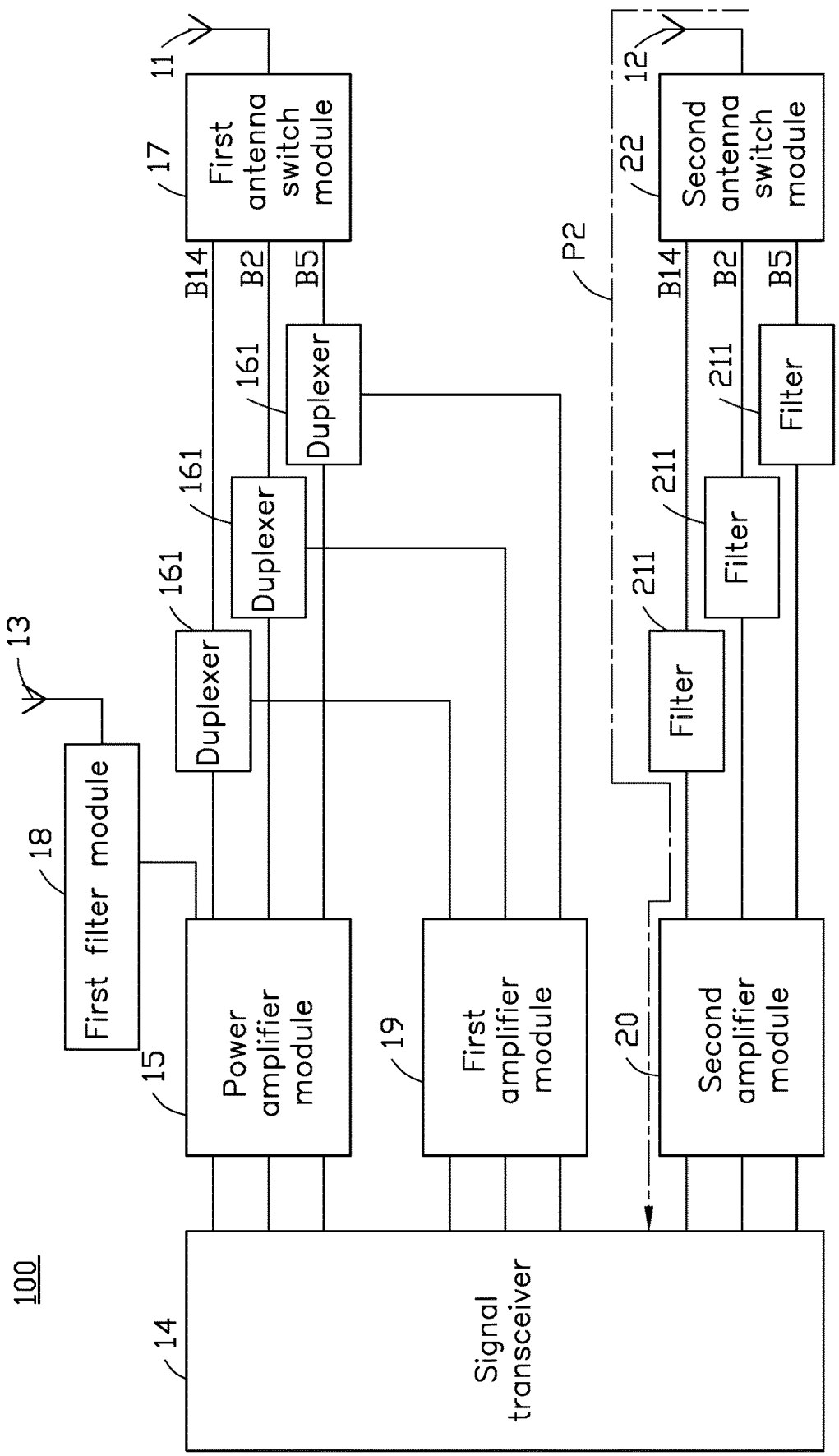
FIG. 4 is a second path distribution graph when a user equipment of an embodiment receives RF signals according to the present disclosure.

In a second situation, the UE 100 may establish communication with the BS 300 and receive the RF signals using the second antenna 12. For example, in this embodiment, the UE 100 may receive the RF signals through the second antenna 12, the second antenna switch module 22, the second filter module 21, the second amplifier module 20, and the signal transceiver 14. Specifically, as illustrated in FIG. 4, when the second antenna 12 receives the RF signals from the BS 300, a corresponding frequency band (such as a frequency band of LTE band14) can be selected and filtered through the second antenna switch module 22 and the second filter module 21. The signal of the frequency band of LTE band14 is amplified through the second amplifier module 20, and then is transmitted to the signal transceiver 14 for processing. For example, the signal is converted into a baseband signal (see path P2).

Figure 5:
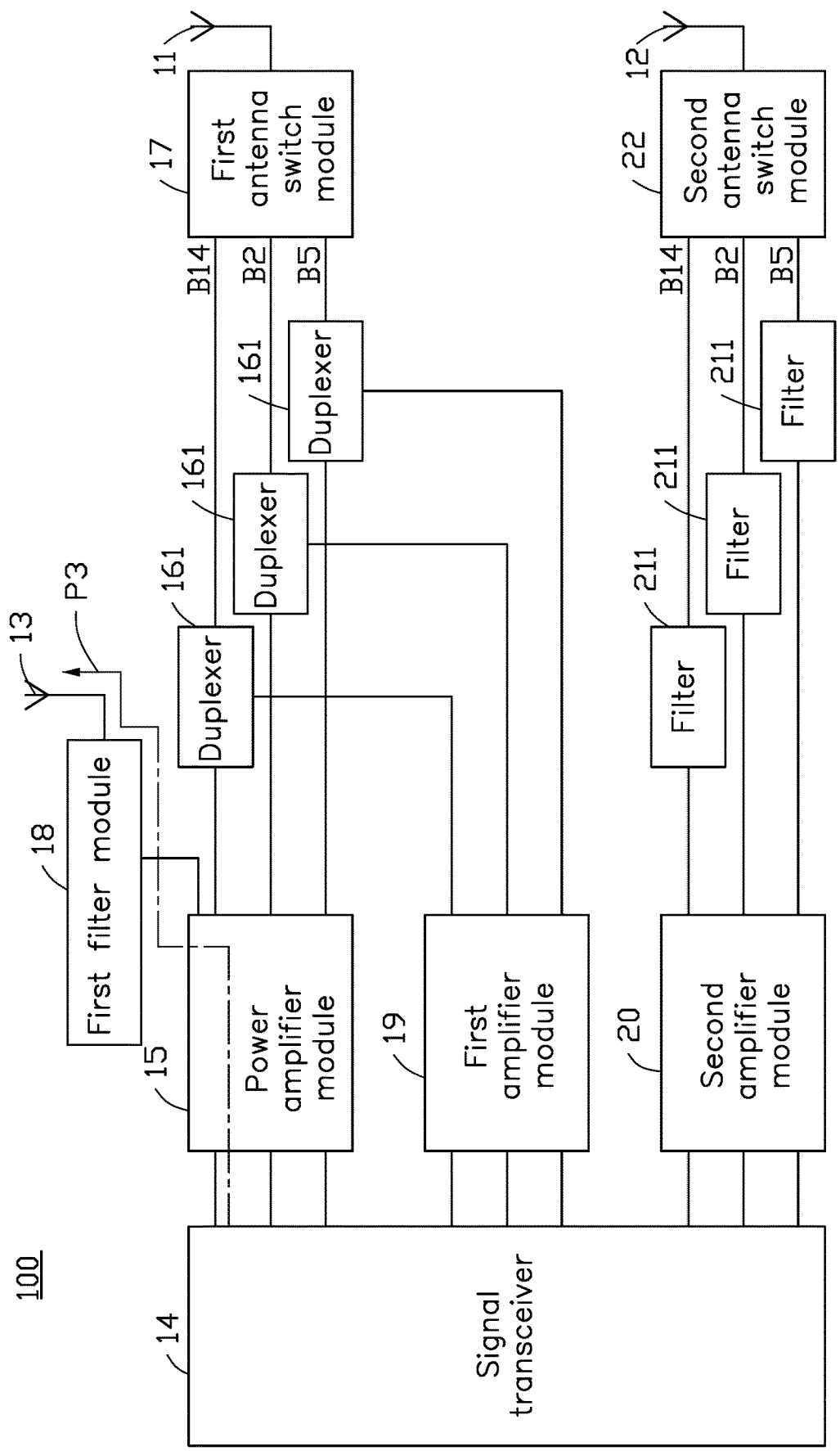
FIG. 5 is a first path distribution graph when a user equipment of an embodiment transmits RF signals according to the present disclosure.

In a third situation, the UE 100 can establish communication with the BS 300 and transmit the RF signal using the third antenna 13. For example, in this embodiment, the UE 100 can transmit the RF signal through the signal transceiver 14, the first filter module 18, and the third antenna 13. Specifically, as illustrated in FIG. 5, when the signal transceiver 14 receives a baseband signal, it converts the baseband signal into an RF signal. The RF signal is then amplified through the power amplifier module 15 and output to the first filter module 18. Then, the first filter module 18 filters the RF signal to select a corresponding frequency band (for example, a frequency band of LTE band14) and transmits it through the third antenna 13 (refer to path P3).

Figure 6:
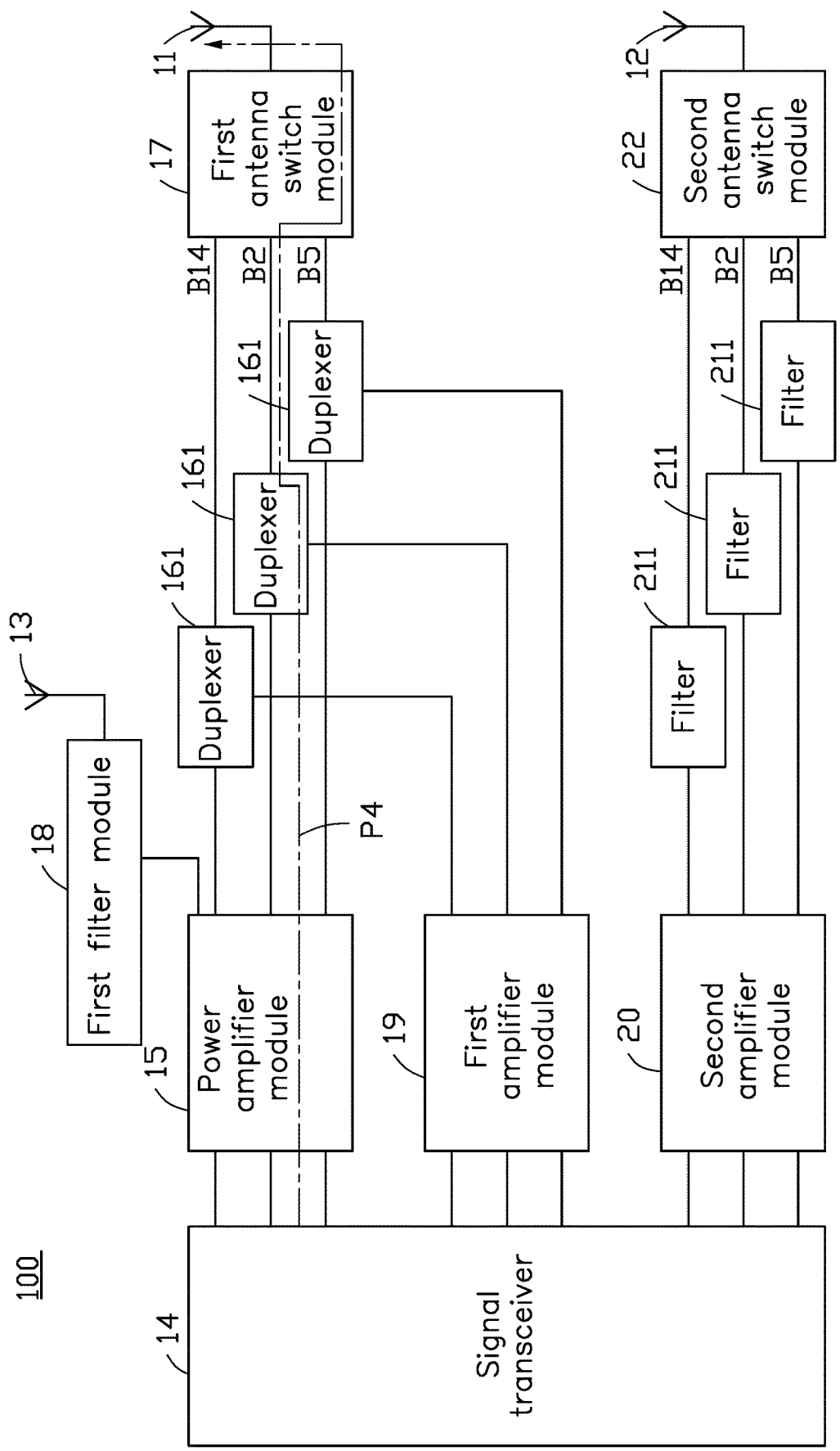
FIG. 6 is a second path distribution graph when a user equipment of an embodiment transmits RF signals according to the present disclosure.

In a fourth situation, the UE 100 may establish communication with the BS 300 and transmit the RF signal using the first antenna 11. For example, in this embodiment, the UE 100 may transmit the RF signals through the signal transceiver 14, the power amplifier module 15, the duplexer module 16, the first antenna switch module 17, and the first antenna 11. Specifically, as illustrated in FIG. 6, when the signal transceiver 14 receives the base frequency signal, the signal transceiver 14 converts the base frequency signal into an RF signal. The RF signal is then amplified through the power amplifier module 15 and output to the duplexer module 16. The corresponding frequency band (for example, the frequency band of LTE band2) is selected by the first antenna switch module 17 and is transmitted through the first antenna 11 (refer to path P4).

As illustrated in FIG. 5 and FIG. 6, in this embodiment, by setting up an independent antenna (for example, the third antenna 13), the third antenna 13 combines with the first filter module 18 to filter out noise which is outside the specific frequency band, then the third antenna 13 can focus on optimizing the specific frequency band without sacrificing the antenna efficiency because of the need to design the bandwidth. For example, in this embodiment, the third antenna 13 is an independent antenna of LTE band14 (788-798 MHz), which focuses on optimizing the frequency band of LTE band14, and its overall design can improve an average antenna gain to −2 dB.

As illustrated in FIG. 5 and FIG. 6 again, as described above, in the transmission process, the baseband signal can be converted into an RF signal through the signal transceiver 14, and then the RF signal is amplified through the power amplifier module 15. After that, the first filter module 18 filters out signals of a non-dominant frequency band (such as LTE band 14 band, 788-798 MHz), and finally the refined signal is transmitted through the third antenna 13.

At the same time, the first antenna 11 can be used to receive the RF signal of the specific frequency band (such as the frequency band of LTE band14). In this way, a frequency multiplexing function can be achieved through an independent setting and cooperation of the first antenna 11 and the third antenna 13.

In other embodiments, when an energy of the third antenna 13 is absorbed or a frequency offset effect characteristic is lower than that of the first antenna 11 due to the UE 100 being held in the hand of a user or other external factors, it can also be set to enable the RF signal of a specific frequency band (such as the frequency band of LTE band14) to be transmitted and received through the first antenna 11, so as to realize multi-path selection and provide more stable communication quality.

Figure 7:
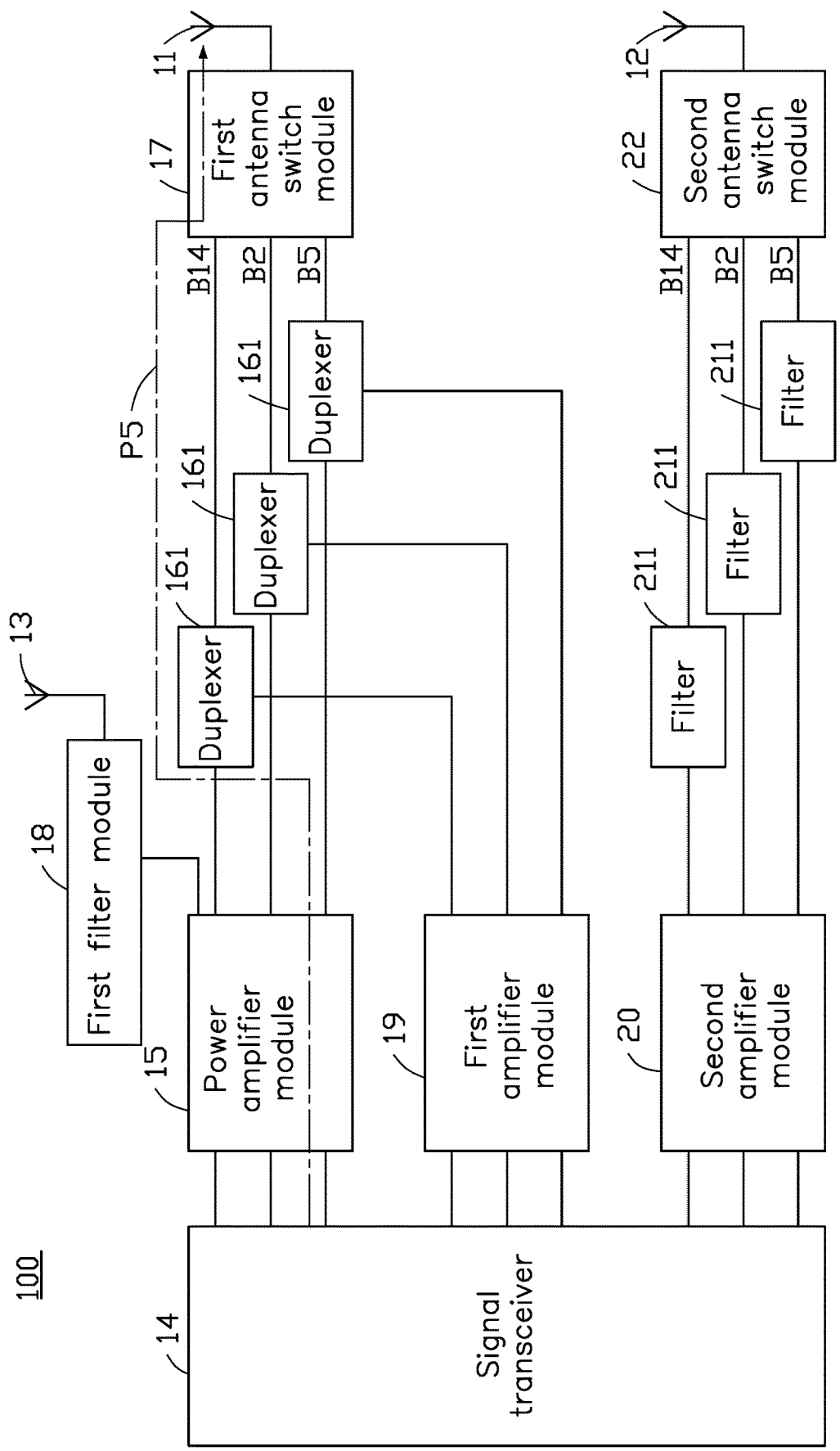
FIG. 7 is a third path distribution graph when a user equipment of an embodiment transmits RF signals according to the present disclosure.

For example, as illustrated in FIG. 7, when a RF signal of a specific frequency band (such as the frequency band of LTE band14) needs to be transmitted, but the energy of the third antenna 13 is absorbed or the frequency offset effect characteristic of the third antenna 13 is lower than that of the first antenna 11 due to the UE 100 being held in the hand of a user or other external factors, the signal transceiver 14 can receive the baseband signal and convert it into an RF signal. Then, after amplification by the power amplifier module 15, the amplified RF signal is output to the duplexer module 16. Then, the corresponding frequency band (for example, the frequency band of LTE band14) is selected by the first antenna switch module 17 and is transmitted through the first antenna 11 (refer to path P5).

Figure 8:
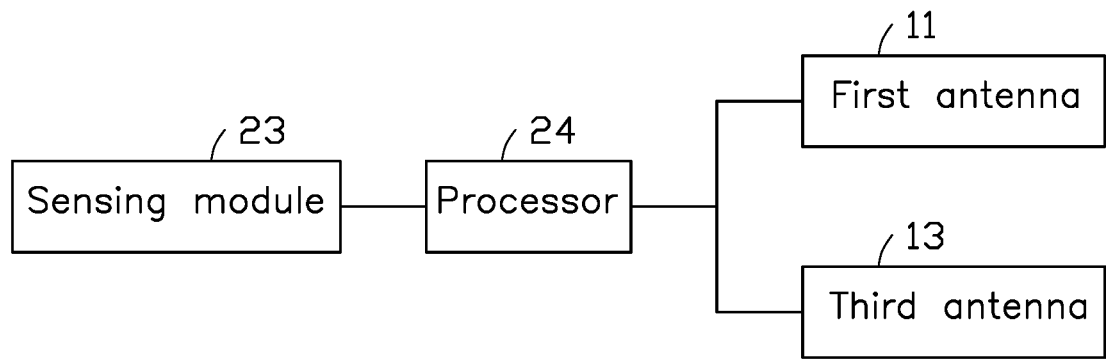
FIG. 8 is a module diagram of a user equipment, of a second embodiment according to the present disclosure.

As illustrated in FIG. 8, in this embodiment, the UE 100 may also include a sensing module 23 and a processor 24. The sensing module 23 is electrically connected to the processor 24. The processor 24 is electrically connected to the first antenna 11 and the third antenna 13.

In this embodiment, the sensing module 23 and the processor 24 cooperate with each other to detect and determine whether the energy of the first antenna 11 is absorbed or the frequency offset effect characteristic of the first antenna 11 and the third antenna 13.

The sensing module 23 and the processor 24 also cooperate with each other to control a switching of a transmission path of the RF signal in a specific frequency band according to the detection results. For example, in one embodiment, the sensing module 23 may be a proximity sensor. When the sensing module 23 detects that the UE 100 is close to a human body, this indicates that energy of the third antenna 13 may be absorbed or the frequency offset effect characteristic of the third antenna 13 may be lower than that of the first antenna 11. Thus, the processor 24 may set a selection or switch to the first antenna 11 for transmitting the RF signals of a specific frequency band (such as the frequency band of LTE band14). When the sensing module 23 detects that the UE 100 is not in proximity to the human body, which indicates that the energy of the third antenna 13 is not absorbed or the frequency offset effect characteristic may not be lower than that of the first antenna 11. Thus, the processor 24 may set a selection or switch to the third antenna 13 for transmitting the RF signals of a specific frequency band (such as the frequency band of LTE band14).

Figure 9:
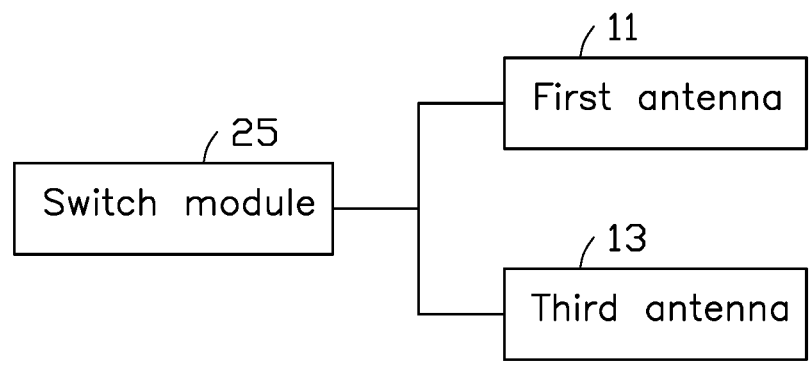
FIG. 9 is a module diagram of a user equipment, of a third embodiment according to the present disclosure.

As illustrated in FIG. 9, in this embodiment, the UE 100 may also include a switch module 25. The switch module 25 is used to select the first antenna 11 or the third antenna 13 for transmitting the RF signals in a specific frequency band when triggered. The switch module 25 may be integrated with buttons of the UE 100, or for other similar mechanisms. Thus, the switching mechanism, such as switch module 25, can be set to realize forced switching manually or there can be manual selection of the first antenna 11 or the third antenna 13 to transmit the RF signals of a specific frequency band.

In this embodiment, the above two methods can exist independently or simultaneously. For example, in one embodiment, the switching of the first antenna 11 or the third antenna 13 can be automatic controlled only by the sensing module 23 and the processor 24. In another embodiment, the switching of the first antenna 11 or the third antenna 13 can be manually controlled only by the switch module 25. Alternatively, in another embodiment, the sensing module 23, the processor 24, and the switch module 25 can be set simultaneously to realize manual and/or automatic control of the switching of the first antenna 11 or the third antenna 13.

For example, when the UE 100 has switched to the first antenna 11 for transmitting the RF signal of a specific frequency band according to the detection of the detection module 23 and the processor 24, the switch module 25 can be operated to forcibly switch to the third antenna 13 for transmitting the RF signal of the specific frequency band.

In this embodiment, by setting up the third antenna 13 and the first filter module 18, that is, setting an independent transmitting antenna, the UE 100 does not need an additional duplexer module 16, that is, the duplexer module 16 can be excluded to effectively reduce a trace loss or an element loss. Furthermore, by setting a transmission path of a specific frequency band, the specific low frequency transmission path does not pass through the first antenna switch module 17 and the first antenna 11, and the trace loss or the element loss is further reduced.

In addition, in this embodiment, the UE 100 can be specially used for signal transmission in a specific frequency band (for example, the frequency band of LTE band14) by setting a third antenna 13, so as to effectively enhance its performance in a specific frequency band and enhance a radiation power.

Specifically, as illustrated in table 1, Table 1 is a comparison table of the characteristics between the UE 100 of this disclosure and a traditional user equipment.

TABLE 1

Comparison of characteristics between the UE 100 and the traditional user equipment

| Link budget calculation for LTE Band14 | Traditional user equipment | UE 100 | HPUE for Power Class 1 (Min. Power) | HPUE for Power Class 1 (Typ. Power) |
|---|---|---|---|---|
| PA Output | 27 | 28 | 32 | 34 |
| Trace loss | 0.8 | 0.5 | 0.8 | 0.8 |
| Duplexer or SAW filter loss | 1.5 | 0.5 | 1.5 | 1.5 |
| Antenna Switch loss | 1 | 0 | 1 | 1 |
| Power on antenna port | 23.7 | 27 | 28.7 | 30.7 |
| Antenna gain | −4 | −2 | −4 | −4 |
| TRP Estimate | 19.7 | 25 | 24.7 | 26.7 |

Table 1 shows that the UE 100 of this disclosure can effectively reduce the trace loss or the element loss, enhance its transmission performance for a specific frequency band, and enhance the radiation power. Specifically, without changing the characteristics of the original elements (for example, an output power of an original power amplifier module being 27-28 dBm), the traditional user equipment without the third antenna 13 can only achieve less than 20 dBm (for example, 19.7 dBm). Compared with the traditional user equipment without the third antenna 13, the radiation power of the UE 100 can be increased to 25 dBm. That is, the radiation performance is improved by about 5 dB.

Figure 10:
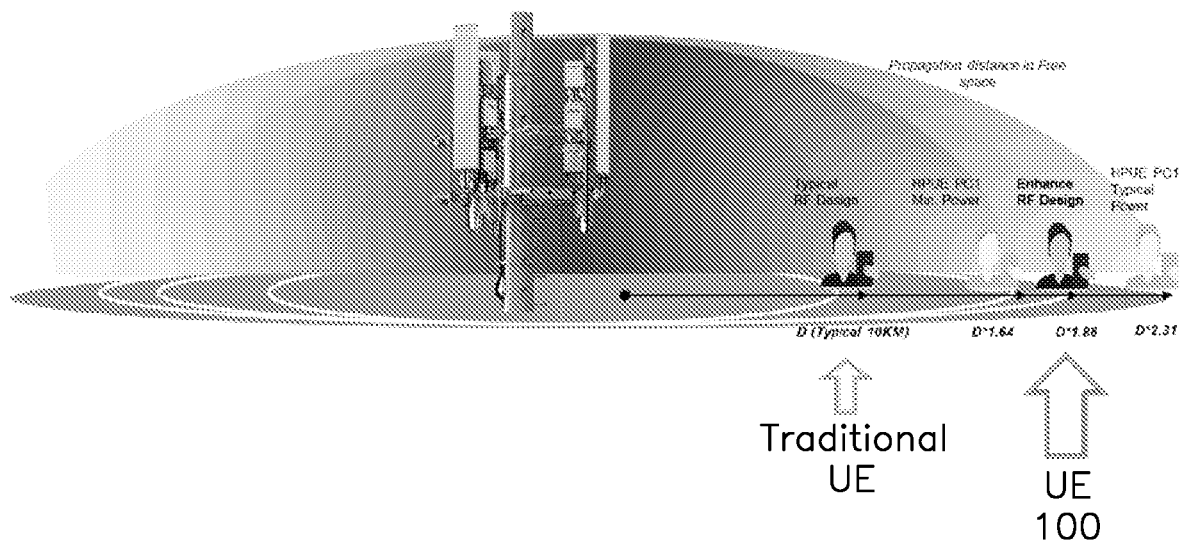
FIG. 10 is a schematic diagram of radiation ranges of traditional user equipment without a third antenna and a user equipment of this disclosure.

FIG. 10 is a schematic diagram of a radiation range of the UE 100 and the traditional user equipment without the third antenna 13. The radiation range of the traditional user equipment is D, D being about 10 km. The radiation range of the UE 100 can be increased 1.88 times D without changing other components, greatly improving its range of use.

In this embodiment, without increasing power consumption, the UE 100 has a wider use range, can realize multipath selection, and can also provide more stable communication quality, which is conducive to an application of the specific frequency band. For example, the Police and Fire Protection services also receive a benefit when using their original frequency band of LTE band14.

Figure 11:
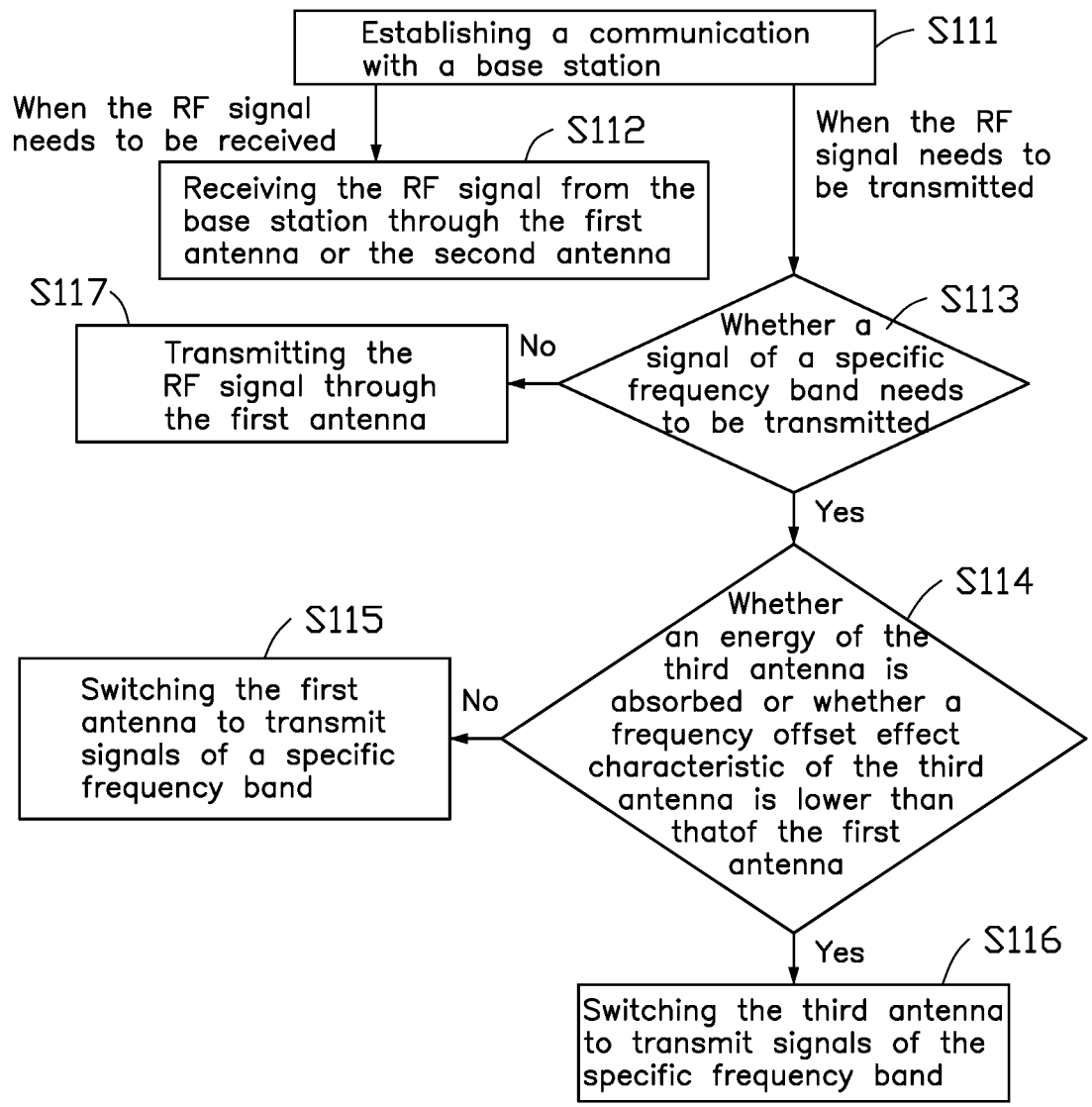
FIG. 11 is a flowchart of a communication method, according to an embodiment of the present disclosure.

FIG. 11 illustrates a flowchart of a communication method. The method can be applied to the UE 100. The method is provided by way of example, as there are a variety of ways to carry out the method. Each block shown in FIG. 11 represents one or more processes, methods, or subroutines which are carried out in the example method. Furthermore, the order of blocks is illustrative only and additional blocks can be added, or fewer blocks may be utilized without departing from the scope of this disclosure.

At block S111, a communication between the UE 100 and the BS 300 is established.

At block S112, when the RF signal needs to be received, the RF signal is received from the BS 300 through the first antenna 11 or the second antenna 12.

At block S113, when the RF signal needs to be transmitted, determine whether a signal of a specific frequency band needing to be transmitted.

In block S113, when determining a RF signal of a specific frequency band needs to be transmitted, block S114 is executed. When determining a radio frequency signal of the specific frequency band is not necessary to be transmitted, block S117 is executed.

In block S113, in this embodiment, the RF signal needing to be transmitted may be a low frequency band, for example, frequency bands of LTE band14, band2, band5. The specific frequency band is a specific low frequency band, for example, the frequency band of LTE band14.

At block S114, whether an energy of the third antenna 13 is absorbed or whether a frequency offset effect characteristic of the third antenna 13 is lower than that of the first antenna 11.

In block S114, when it is determined that the energy of the third antenna 13 is absorbed or the frequency offset effect characteristic of the third antenna 13 is lower than that of the first antenna 11, block S115 is executed. When it is determined that the energy of the third antenna 13 is not absorbed or the frequency offset effect characteristic of the third antenna 13 is not lower than that of the first antenna 11, block S116 is executed.

In block S114, the sensing module 23 and the processor 24 can be used to detect and determine whether the energy of the third antenna 13 is absorbed or the frequency offset effect performance of the first antenna 11 and the third antenna 13. Specifically, for a description of the sensing module 23 and the processor 24, please refer to the description of the corresponding elements of the UE 100, which will not be repeated here.

At block S115, when it is determined that the energy of the third antenna 13 is absorbed or the frequency offset effect characteristic of the third antenna 13 is lower than that of the first antenna 11, the first antenna 11 is switched to transmit signals of a specific frequency band (for example, the frequency band of LTE band14) through the first antenna 11.

At block S116, when it is determined that the energy of the third antenna 13 is not absorbed or the frequency offset effect characteristic is not lower than that of the first antenna 11, the third antenna 13 is switched to transmit signals in the specific frequency band (for example, the frequency band of LTE band14) through the third antenna 13.

In block S117, when it is determined that it is not necessary to transmit the RF signal of a specific frequency band, the RF signal is transmitted through the first antenna 11.

Figure 12:
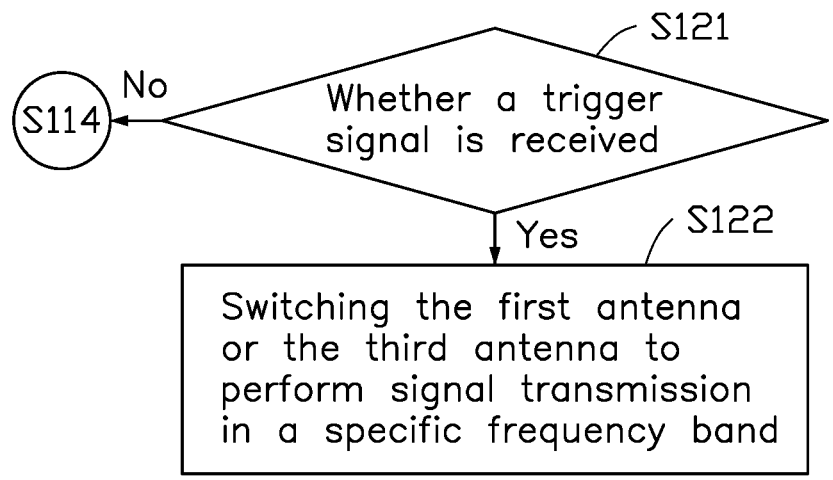
FIG. 12 is a flowchart of a communication method, according to another embodiment of the present disclosure.

As illustrated in FIG. 11 and FIG. 12, in other embodiments, in block S113, when it is determined that a RF signal of a specific frequency band needs to be transmitted, the method can also include the following blocks.

At block S121, determining whether a trigger signal is received.

In block S121, when it is determined that the trigger signal is received, block S122 is executed. When it is determined that no trigger signal is received, block S114 (see FIG. 11) is executed to continue to determine whether the energy of the third antenna 13 is absorbed or whether the frequency offset effect characteristic is lower than that of the first antenna 11. Thus, the corresponding blocks, such as block S115 or block S116, may be executed according to the determination results.

It can be understood that the description of blocks S114-S116 can be referred to FIG. 11 and the above description, which will not be repeated here.

At block S122, the first antenna 11 or the third antenna 13 is switched to perform signal transmission in a specific frequency band (such as the frequency band of LTE band 14) using the first antenna 11 or the third antenna 13.

In this embodiment, the transmission of RF signals of a specific frequency band may be manually controlled or selected by detecting whether the switch module 25 is triggered or not. Specifically, a description of the switch module 25 may be referred to the description of the corresponding element of the UE 100, which will not be repeated here.

It can be understood that a beneficial effect of the communication method of this disclosure can refer to the beneficial effect of the UE 100, which will not be repeated here.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A user equipment comprising:
    a signal transceiver configured to process a conversion of a baseband signal and a radio frequency signal;
    a first antenna, the first antenna being a primary antenna and electrically connected to the signal transceiver for receiving and transmitting the radio frequency signal;
    a second antenna, the second antenna being a diversity antenna and electrically connected to the signal transceiver for receiving the radio frequency signal;
    a third antenna, the third antenna being a low frequency antenna and electrically connected to the signal transceiver for transmitting a radio frequency signal of a specific low frequency band; and
    a power amplifier module, the power amplifier module being electrically connected between the signal transceiver and the first antenna, the power amplifier module being also electrically connected to the third antenna, the power amplifier module configured to amplify the radio frequency signal output by the signal transceiver and output the amplified radio frequency signal to the first antenna and/or the third antenna;
    wherein the user equipment further comprises a first amplifier module, a duplexer module and a first antenna switch module; and wherein the duplexer module comprises a plurality of duplexers, each duplexer is respectively connected to the power amplifier module, the first antenna switch module, and the first amplifier module, and each duplexer corresponds to a low frequency band.

2. The user equipment of claim 1, further comprising a first filter module, wherein the first filter module is a low pass filter, the first filter module is electrically connected to the power amplifier module and the third antenna;
    wherein the first filter module filters the radio frequency signal amplified by the power amplifier module, and filters the radio frequency signal other than the radio frequency signal of the specific low frequency band.

3. The user equipment of claim 2, wherein the first antenna switch module is electrically connected between the power amplifier module and the first antenna;

wherein the first antenna switch module switches and selects the amplified radio frequency signal, and transmits the selected radio frequency signal through the first antenna.

4. The user equipment of claim 3, wherein the duplexer module is electrically connected between the power amplifier module and the first antenna switch module, the first amplifier module is electrically connected between the duplexer module and the signal transceiver;

wherein when the first antenna receives the radio frequency signal, the first antenna switch module switches and selects the received radio frequency signal, and outputs the radio frequency signal amplified by the duplexer module and the first amplifier module to the signal transceiver.

5. The user equipment of claim 4, further comprising a second amplifier module, a second filter module, and a second antenna switch module, wherein the second amplifier module, the second filter module, and the second antenna switch module are electrically connected between the signal transceiver and the second antenna in turn;

wherein the second antenna switch module and the second filtering module switch and filter the radio frequency signal received by the second antenna, and the second amplifier module amplifies the filtered radio frequency signal and outputs to the signal transceiver.

6. The user equipment of claim 1, further comprising a switch module, wherein the switch module selects the first antenna or the third antenna to transmit the radio frequency signal of the specific low frequency band when the switch module is triggered.

7. A communication method applicable to a user equipment, wherein the user equipment comprises a first antenna and a third antenna, the first antenna is a primary antenna and is configured to receive and transmit a radio frequency signal; the third antenna is a low frequency antenna and configured for transmitting a radio frequency signal of a specific low frequency band; the method comprising:

establishing a communication with a base station;
determining whether the radio frequency signal of the specific low frequency band is to be transmitted;
determining whether an energy of the third antenna is absorbed or whether a frequency offset effect characteristic of the third antenna is lower than that of the first antenna, when the radio frequency signal of the specific low frequency band is determined to be transmitted; and
switching the third antenna to transmit the radio frequency signal of the specific low frequency band, when the energy of the third antenna is not absorbed, or the frequency offset effect characteristic of the third antenna is not lower than that of the first antenna.

8. The communication method of claim 7, further comprising:

determining whether a trigger signal is received;
switching the first antenna or the third antenna to perform signal transmission of the specific low frequency band.

9. The communication method of claim 8, wherein when it is determined that the trigger signal is not received, the method further comprises:

determining whether the energy of the third antenna is absorbed or whether the frequency offset effect characteristic of the third antenna is lower than that of the first antenna.

10. The communication method of claim 7, wherein when the radio frequency signal of the specific low frequency band is determined not be transmitted, the method further comprises:

transmitting the radio frequency signal through the first antenna.

11. The communication method of claim 10, before transmitting the radio frequency signal through the first antenna, the method further comprising:

amplifying the radio frequency signal; and
switching and selecting the amplified radio frequency signal.

12. The communication method of claim 7, before transmitting the radio frequency signal through the third antenna, the method further comprising:

amplifying the radio frequency signal of the specific low frequency band; and
filtering radio frequency signals other than the radio frequency signal of the specific low frequency band.

13. The communication method of claim 7, wherein when a radio frequency signal is to be received, the method further comprises:

receiving the radio frequency signal through the first antenna or a second antenna;
wherein the second antenna is a diversity antenna and configured for receiving the radio frequency signal.

14. The communication method of claim 13, wherein when the first antenna receives the radio frequency signal, the method further comprises:

switching and selecting the received radio frequency signal;
amplifying the received radio frequency signal; and
outputting the amplified radio frequency signal.

15. The communication method of claim 13, wherein when the second antenna receives the radio frequency signal, the method further comprises:

switching and filtering the received radio frequency signal;
amplifying the received radio frequency signal; and
outputting the amplified radio frequency signal.

16. A user equipment comprising:

a signal transceiver configured to process a conversion of a baseband signal and a radio frequency signal;
a first antenna, the first antenna being a primary antenna and electrically connected to the signal transceiver for receiving and transmitting the radio frequency signal;
a second antenna, the second antenna being a diversity antenna and electrically connected to the signal transceiver for receiving the radio frequency signal;
a third antenna, the third antenna being a low frequency antenna and electrically connected to the signal transceiver for transmitting a radio frequency signal of a specific low frequency band; and
a power amplifier module, the power amplifier module being electrically connected between the signal transceiver and the first antenna, the power amplifier module being also electrically connected to the third antenna, the power amplifier module configured to amplify the radio frequency signal output by the signal transceiver and output the amplified radio frequency signal to the first antenna and/or the third antenna;
wherein the user equipment further comprises a sensing module and a processor, the sensing module is electrically connected to the processor, the processor is connected to the first antenna and the third antenna, wherein the sensing module and the processor determine whether an energy of the third antenna is absorbed, or detect whether a frequency offset effect performance of the third antenna is lower than that of the first antenna, and control the switching between the first antenna and the third antenna according to a detection result, so as to transmit the radio frequency signal of the specific low frequency band.

17. The user equipment of claim 16, further comprising a switch module, wherein the switch module selects the first antenna or the third antenna to transmit the radio frequency signal of the specific low frequency band when the switch module is triggered.

18. The user equipment of claim 16, further comprising a first filter module, wherein the first filter module is a low pass filter, the first filter module is electrically connected to the power amplifier module and the third antenna;
- wherein the first filter module filters the radio frequency signal amplified by the power amplifier module, and filters the radio frequency signal other than the radio frequency signal of the specific low frequency band;
- wherein a first antenna switch module is electrically connected between the power amplifier module and the first antenna;
- wherein the first antenna switch module switches and selects the amplified radio frequency signal, and transmits the selected radio frequency signal through the first antenna.

19. The user equipment of claim 18, wherein a duplexer module is electrically connected between the power amplifier module and the first antenna switch module, a first amplifier module is electrically connected between the duplexer module and the signal transceiver; and wherein when the first antenna receives the radio frequency signal, the first antenna switch module switches and selects the received radio frequency signal, and outputs the radio frequency signal amplified by the duplexer module and the first amplifier module to the signal transceiver.

20. The user equipment of claim 19, further comprising a second amplifier module, a second filter module, and a second antenna switch module, wherein the second amplifier module, the second filter module, and the second antenna switch module are electrically connected between the signal transceiver and the second antenna in turn; and wherein the second antenna switch module and the second filtering module switch and filter the radio frequency signal received by the second antenna, and the second amplifier module amplifies the filtered radio frequency signal and outputs to the signal transceiver.

* * * * *